United States Patent [19]

Seals

[11] 4,411,090

[45] Oct. 25, 1983

[54] TROLLING PLANE

[76] Inventor: Ralph W. Seals, 5935 30th Ave. S., Gulf Port, Fla. 33707

[21] Appl. No.: 350,523

[22] Filed: Feb. 19, 1982

[51] Int. Cl.³ ............................................ A01K 95/00
[52] U.S. Cl. .................................................... 43/43.13
[58] Field of Search ....................................... 43/43.13

[56] References Cited

U.S. PATENT DOCUMENTS

| | | | |
|---|---|---|---|
| 2,235,868 | 3/1941 | Coolidge | 43/43.13 |
| 2,520,562 | 8/1950 | Peeler | 43/43.13 |
| 3,466,787 | 9/1969 | Collins | 43/43.13 |
| 3,667,148 | 6/1972 | Dawson | 43/43.13 |
| 3,708,904 | 1/1973 | Zaharis | 43/43.13 |
| 3,835,573 | 9/1974 | Borchardt | 43/43.13 |
| 3,863,382 | 2/1975 | Heili | 43/43.13 |
| 4,128,959 | 12/1978 | Staaden | 43/43.13 |
| 4,199,891 | 4/1980 | Davis | 43/43.13 |

Primary Examiner—Gene Crosby

[57] ABSTRACT

An improvement is disclosed for a trolling plane of the type comprising a wire frame for connection of a fishing line to a trolling line and having a hydrofoil mounted on a support section and a connecting ring for the trolling line slidably connected to a ramp section of the frame. The improvement comprises a wire frame formed as a closed loop with a hydrofoil of inverted V-shape cross-section mounted on the support section for pivotal motion about its longitudinal axis relative to the frame.

5 Claims, 4 Drawing Figures

TROLLING PLANE

FIELD OF THE INVENTION

This invention relates to fishing equipment and more particulrly it relates to trolling planes for causing a fishing line to submerge to a desired depth while trolling.

BACKGROUND OF THE INVENTION

Various devices have been developed in the prior art to facilitate fishing with a baited hook or lure at depths down to a few hundred feet below the surface. Such devices generally comprise a frame with a shaped plate or hydrofoil with a trolling line and a fishing line connected to the frame. The hydrofoil assumes a diving attitude during trolling with the fishing line trailing behind a boat. An abrupt pull on the fishing line, as in the case of a strike by a fish, causes a shift in the attitude of the hydrofoil and results in the device climbing to the surface. Such devices are sometimes known as trolling planes, diving planes or downriggers. Whatever the name, there has been a high degree of refinement in design to obtain improved performance.

The Cooledge et al U.S. Pat. No. 2,235,868 discloses a wire frame structure with a lower portion turned up at its rear end and attached to a plane; the forward end in front of the plane is arched upwardly and rearwardly to an elbow at which it extends downwardly and attaches to the plane. A trolling line is attached by a loop through the wire frame and the loop is movable along the arched portion thereof. The fishing line is attached to the rear of the plane.

The Dawson U.S. Pat. No. 3,667,148 discloses a trolling plane similar to that described above but having the fishing line pass through an opening in the plate and being attached to the wire frame adjacent its connection with the plate. The Heili U.S. Pat. No. 3,863,382 discloses a trolling plane having a hydrofoil or "vane" rigidly mounted between the spaced ends of the wire frame. The vane is formed as a pair of V-shaped channels to provide a desired hydrodynamic effect.

Other prior art trolling planes of the type described above are disclosed in the following U.S. Pat. Nos. Collins 3,466,787; Zaharis 3,708,904; Staaden 4,128,959; and Davis 4,199,891.

A general object of this invention is to provide an improved trolling plane which overcomes certain disadvantages of the prior art.

SUMMARY OF THE INVENTION

According to this invention, a trolling plane is provided which exhibits improved performance characteristics and which is of simple and low cost construction. The trolling plane of this invention is highly stable and operates in diving, trolling and surfacing modes with great immunity to disturbances such as hitting a rock, turbulance, or abrupt change of direction of the trolling line. Additionally, it is highly resistant to fouling or entanglement with other lines. The trolling plane is adapted to dive at a desired angle of descent with a minimum requirement for sinker weight and it automatically surfaces when a fish strikes the lure.

According to this invention, a trolling plane is provided with a frame and an independently movable hydrofoil mounted thereon. The hydrofoil is especially adapted to maintain hydrodynamic stability regardless of disturbances. This is accomplished by a rigid frame and a hydrofoil pivotally mounted thereon with a degree of freedom for pivotal motion about the longitudinal axis of the hydrofoil. Preferably, the frame is formed of a closed wire loop with a support section thereof threaded through a pair of openings in the hydrofoil at spaced locations along the longitudinal axis.

Further, the invention provides an improvement for a trolling plane of the type comprising a wire frame for connecting a fishing line to a trolling line and having a hydrofoil mounted on a support section and a ring slidably connected to a ramp section of the frame. According to the improvement, the hydrofoil is mounted on the support section for pivotal motion about its longitudinal axis relative to the frame. Preferably, the frame is a closed loop of wire with a tail section extending between the ramp section and the support section. The hydrofoil is of inverted V-shape in cross-section and the support section of the frame is threaded through a pair of openings in the hydrofoil on the longitudinal axis thereof. A sinker is disposed on the support section at a location forward of the hydrofoil.

A more complete understanding of this invention may be obtained from the detailed description that follows taken with the accompanying drawings.

BEST MODE FOR CARRYING OUT THE INVENTION

Figure 1:
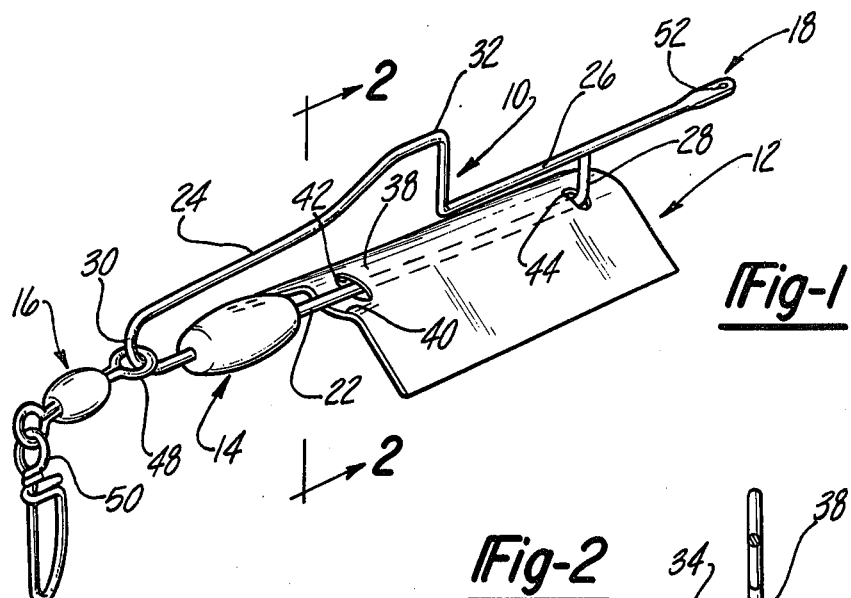
FIG. 1 shows the inventive trolling plane in a perspective view.
Figure 2:
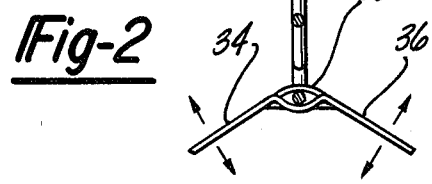
FIG. 2 is a cross-sectional view taken on line 2—2.

Referring now to the drawings, there is shown an illustrative embodiment of the invention in a trolling plane which is constructed of metal parts in a particular configuration. It will be appreciated as the description proceeds that the invention may be used in other embodiments.

The trolling plane comprises, in general, a wire frame 10, a hydrofoil 12 mounted on the frame, and a sinker 14. It also comprises a connector 16 for coupling the frame to a trolling line which is trailed from a boat. A connector element 18 is provided at the rear of the frame 10 for connection with a fishing line.

The frame 10 comprises a stiff wire which is formed into a closed loop comprising, in general, a support section 22 a nose or ramp section 24 and a tail section 26. The support section 22 is generally straight and terminates at its rear end in a rear bight 28 which joins the support section and the tail section. In the bight 28, one end of the wire abuts and is welded to the tail section 26. The forward end of the support section 22 terminates in a forward bight 30 which joins the support section 22 and the ramp section 24. The ramp section 24 is inclined upwardly relative to the support section and terminates in an intermediate bight 32 which joins the ramp section 24 with the tail section 26. The tail section 26 is straight and parallel to the support section 22 and extends past the elbow 28 and terminates at its free end in the connector element 18.

The hydrofoil 12, suitably formed of sheet metal, is mounted on the support section 22. The hydrofoil has an inverted V-shape cross-section and comprises a pair of planar portions 34 and 36 which are joined by an arcuate section 38 extending along the longitudinal axis of the hydrofoil. At the forward end of the hydrofoil, the arcuate section 38 is deformed downwardly to provide a channel 40 and to define an opening 42 on the longitudinal axis. Another opening 44 is provided in the arcuate section 38 at the rear end of the hydrofoil. The support section 22 of the wire frame is threaded through the forward opening 42 and the rearward opening 44 with the bight 28 at the opening 44. A retainer 46 is suitably welded to the bottom surface of the hydrofoil, and extends beneath the support section 22 to hold the arcuate section 38 of the hydrofoil adjacent the support section 22. This mounting of the hydrofoil 12 provides a degree of freedom about its longitudinal axis permitting it to pivot or rotate about that axis.

The sinker 14, suitably of lead, is mounted on the support section 22 of the frame between the forward end of the hydrofoil 12 and the bight 30 of the frame. The connector 16 comprises a body with a ring 48 at its rear end and which encircles the ramp section 24 of the frame. The ring 48 is freely slidable on the ramp section between the bight 30 and the bight 32. The connector 16 is provided with a safety pin 50 at its forward end for connection with a trolling line. The connector element 18 on the tail section of the frame suitably comprises a flat portion with an opening 52 therein. A safety pin 54 is connected through the opening and is adapted to receive a fishing line.

Figure 3:
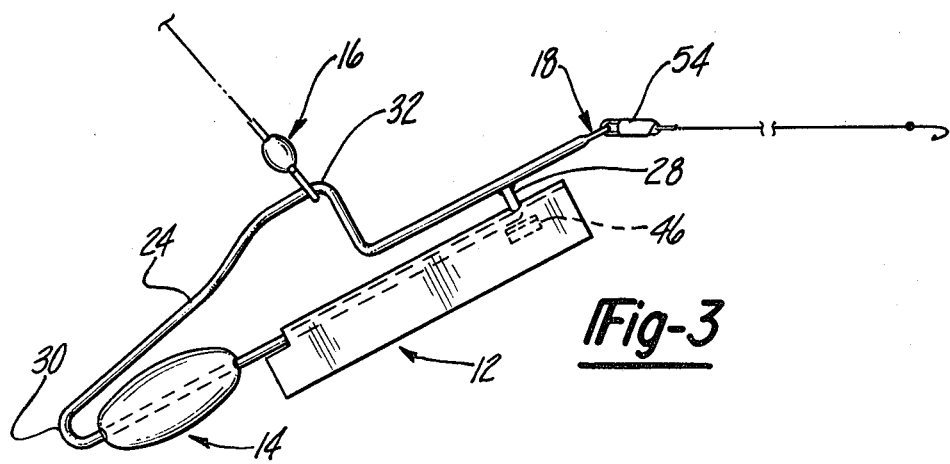
FIG. 3 is a side elevation with the trolling plane in a diving attitude.
Figure 4:
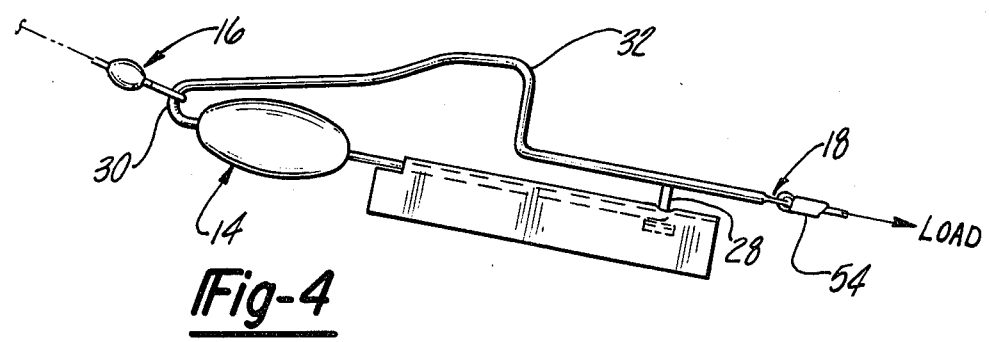
FIG. 4 is a side elevation with the trolling plane in a climbing attitude.

When the trolling plane is dropped into the water, it is suspended by the trolling line with the ring 48 of the connector 16 engaging the intermediate bight 32. By reason of the weight of sinker 14, the trolling plane assumes a diving attitude as shown in FIG. 3. Forward movement of the trolling plane causes it to submerge to a depth depending upon several factors including the diving attitude and the length of the trolling line. During the trolling operation, the fishing line trails behind and the pull it exerts is insufficient to move the ring 48 away from the bight 32. The trolling plane is highly immune to external disturbances such as hitting the bottom, turbulent water, currents or abrupt changes in the direction of the trolling line. When a fish strikes the lure and is caught on the fishing line, the pull is sufficient to cause the ring 48 on connector 16 to move forwardly to the forward bight 30. This causes the trolling plane to assume a climbing attitude as shown in FIG. 4. The trolling plane thus tends to climb to the surface under the control of the trolling line.

Although the description of this invention has been given with reference to a particular embodiment it is not to be construed in the limiting sense. Many variations and modifications will now occur to those skilled in the art. For a definition of the invention reference is made to the appended claims.

What is claimed is:

1. In a trolling plane for submerging a fishing line, said plane being of the type comprising a wire frame having a support section extending fore and aft, said frame having a ramp section extending between a first bight at the forward end of the frame and a second bight located aft of the first bight, a ring on the ramp section of the wire frame for connection of a trolling line from a boat to the frame, said frame being adapted for connection of a fishing line thereto, a sinker mounted on said frame at a location forward of the second bight so that the frame assumes a diving attitude when the frame is suspended by the trolling line with the ring located at said second bight, and a hydrofoil mounted on the support section of said frame, the improvement wherein said hydrofoil has a central longitudinal axis extending fore and aft and is mounted on said support section for pivotal motion about its longitudinal axis relative to said frame.

2. The invention as defined in claim 1 wherein said wire frame comprises a closed loop of wire with a tail section extending from said second bight to a third bight at the rear of said support section.

3. The invention as defined in claim 2 wherein said hydrofoil is of an inverted V-shape in cross-section.

4. The invention as defined in claim 3 wherein said hydrofoil has first and second openings in spaced relation along said longitudinal axis, said support section of said frame being threaded through the said openings for said pivotal motion.

5. The invention as defined in claim 4 wherein said sinker is disposed on said support section between said first bight and the forward end of said hydrofoil.

* * * * *